Sept. 30, 1947. J. TATE 2,428,049
DRILL PRESS
Filed Oct. 26, 1943 2 Sheets-Sheet 2
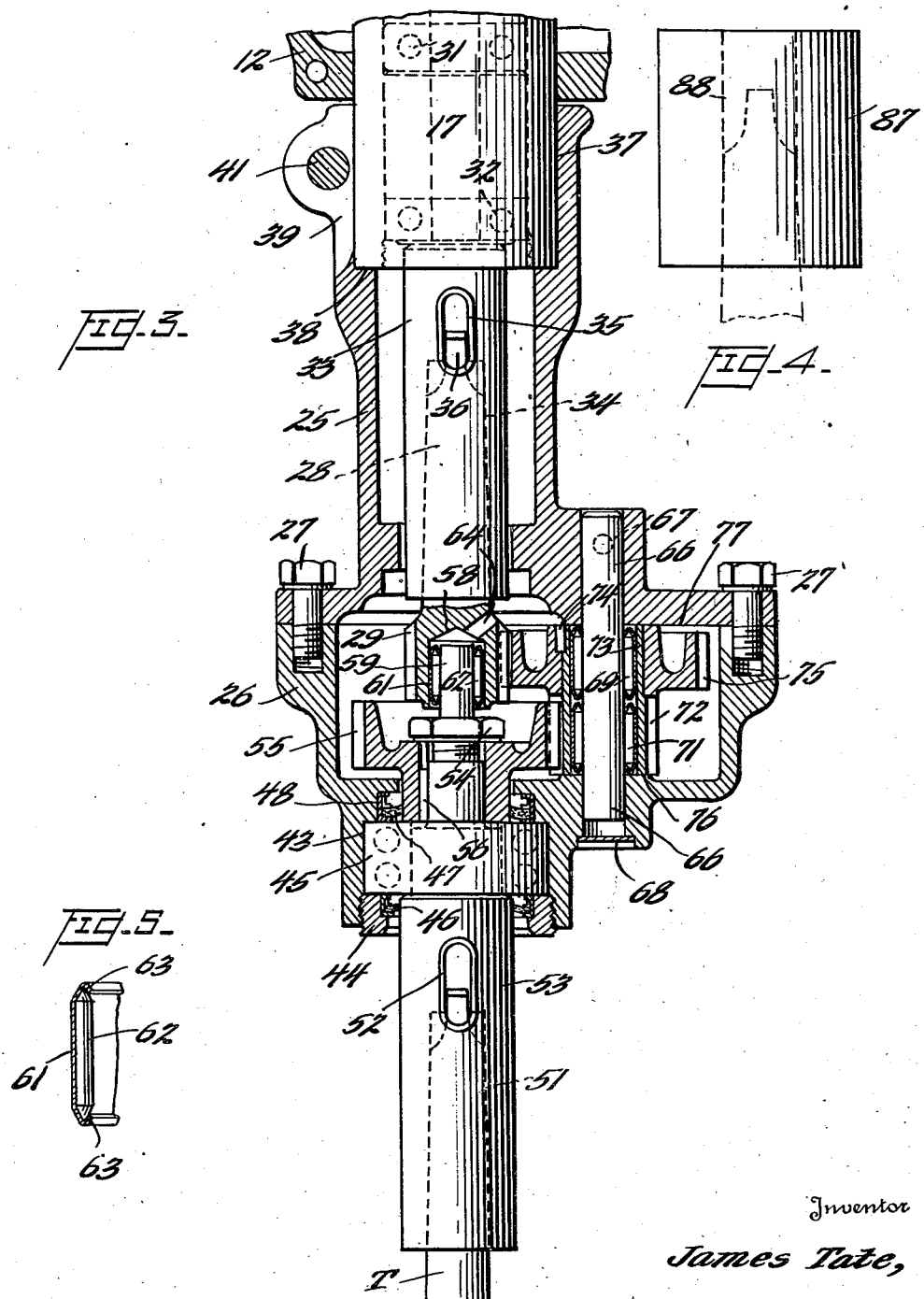

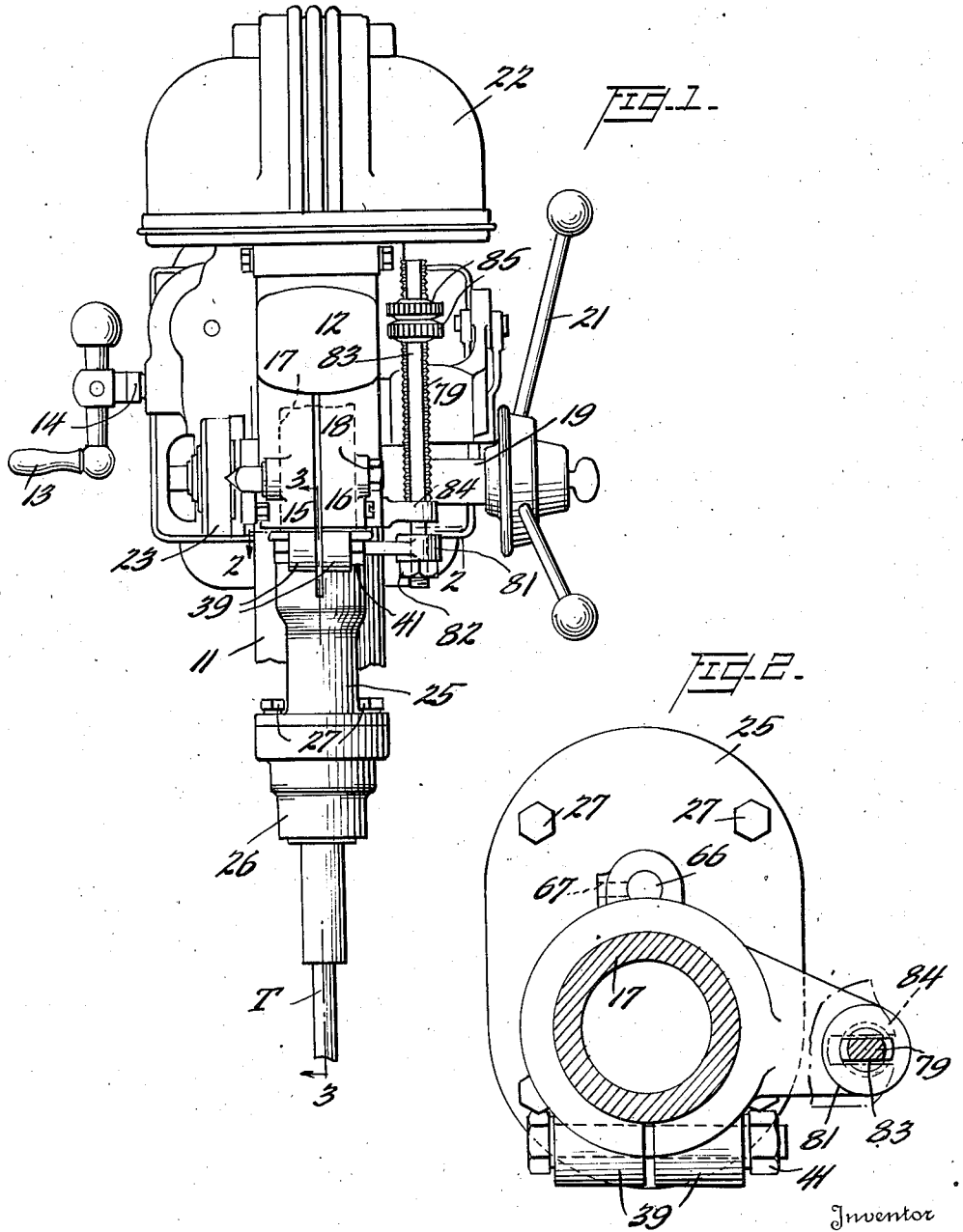

Patented Sept. 30, 1947

2,428,049

UNITED STATES PATENT OFFICE 2,428,049

DRILL PRESS

James Tate, Racine, Wis., assignor, by mesne assignments, to Rockwell Manufacturing Company, Pittsburgh, Pa., a corporation of Pennsylvania Application October 26, 1943, Serial No. 507,685

7 Claims. (Cl. 77—55)

1

The present invention relates to drill presses and is more particularly concerned with speed reducing gearing attachments, applicable to existing drill presses, for reducing the speed sufficiently to permit the use of the drill press in spot facing, counter sinking, counter boring, wood drilling and other operations, to thereby increase the flexibility of drill presses already in the field and adapt them for carrying out work which they would normally be incapable of handling, due to the high speed of the spindle.

While attachments of this nature have been heretofore proposed, and they have been used to a limited extent, they are open to the objection that the drilling thrusts are transmitted directly from the auxiliary spindle to the main drill press spindle, resulting in excessive wear of the parts; many of them require modification of the drill press and are of complicated costly design; others are of such construction that they cannot be successfully used when the drill press spindle has any appreciable degree of run out; and none of them embody a completely successful method of restraining the auxiliary housing or gear casing against rotation in response to the torque reaction set up during operation.

It is the major object of this invention to provide a slow speed attachment of novel construction which may be applied to drill presses already in the field and which permits a high input belt speed and imparts a positive, chatter-free rotation to the output spindle, thus eliminating the usual chatter always resulting from a slow speed spindle driven directly by a belt; which may be applied to and removed from a drill with a minimum of time and effort; and yet is of simple, low cost, rugged construction.

I have found that by providing a slow speed housing having an auxiliary spindle journalled in combined radial and thrust bearings, and an input shaft freely insertable into and removable from the housing and carrying a gear for driving the speed reducing gearing, and designing the shaft for ready attachment to the existing drill press spindle, and providing a locating shoulder on the housing operable to limit the upward movement of the slow speed housing with respect to the drill press quill sufficiently to prevent the parts of the reduction gearing from being brought into endwise thrust-transmitting relationship with the removable shaft, an attachment is provided in which the auxiliary shaft may be removed from the attachment and applied directly to the drill press spindle and thereafter the slow speed housing may be fitted upwardly over the shaft and secured to the drill press quill, the locking shoulder preventing the shaft from transmitting endwise thrust to the drill press spindle, with the thrust bearings associated with the auxiliary spindle transmitting the entire drilling load to the auxiliary casing. Also, by undercutting the teeth of the gear carried by the removable shaft it is possible to successfully employ the attachment, even when the drill press spindle has a substantial degree of run out.

It is accordingly a further important object of the invention to provide a slow speed attachment for drill presses embodying a gear housing and an insertable and removable input shaft which may be removed from the housing and applied directly to the drill press spindle and the housing thereafter fitted upwardly over the shaft and secured to the drill press quill, thereby providing a structure which may be readily attached to the existing gear presses, insures trouble-free operation and precludes injury to any of the drill press parts.

Another object is to provide a slow speed attachment which may be successfully utilized even when there is considerable run out of the main spindle.

A further object is to provide a slow speed attachment for drill presses having means for supporting the stop rod of the drill press on the slow speed housing in cooperative relationship with the stop lugs of the drill press structure in such manner as to perform the dual purpose of adjustably limiting downward movement of the quill and at the same time restraining the attachment against rotation in response to the torque reaction set up during operation.

Further objects will become apparent as the specification proceeds in conjunction with the annexed drawings, and from the appended claims.

In the drawings

Figure 1 is a front elevational view showing the slow speed attachment of the invention applied to a conventional drill press;

Figure 2 is a horizontal sectional view taken substantially on the line 2—2 of Figure 1;

Figure 3 is a vertical sectional view taken substantially on the line 3—3 of Figure 1;

Figure 4 is a view of the input shaft retaining member illustrating its relationship to Figure 3, at the level it assumes when installed in the upper end of the slow speed housing; and Figure 5 is a fragmental sectional view on an enlarged scale of the needle bearing assembly.

With continued reference to the drawings, in which like reference characters have been applied to similar parts throughout the several views, the drill press to which the invention has been applied is of well known construction and comprises a vertical supporting column 11, upon which the head structure designated generally as 12, is mounted for guided vertical movement. The head is adapted to be raised and lowered on the column by means of a rack and pinion (not shown), the pinion being actuated by a crank 13 carried by a pinion shaft 14 journalled in the head. Mounted for vertical guided movement in the head, between a pair of split portions 15 and 16 of the housing, is a quill 17 and it is adapted to be locked in adjusted position by a bolt and nut assembly 18, which is adapted to contract them about the quill. The quill is to be raised and lowered by means of a rack and pinion (not shown) and the pinion shaft 19 is adapted to be rotated by a hand wheel 21. The quill is driven in well known manner by a motor driving through stepped belt and pulley assemblies (not shown) contained in a top belt guard closure 22. A torsion spring (not shown) contained in a closure 23 urges shaft 19 in such direction as to lift the quill, and it is adjusted in well known manner to properly counterbalance the weight thereof.

The construction so far described is a conventional drill press structure and while I have illustrated the invention as being applied thereto, it is to be understood that the invention is not limited for use therewith, as it may advantageously be employed with other designs of drill presses.

The attachment of the invention comprises a speed reducing housing or casing made up of upper and lower sections 25 and 26, respectively, detachably secured together by a cap screw 27 or the like, and a readily insertable and removable input shaft 28 carrying a preferably integral drive gear 29 at its lower end. The teeth of gear 29 are preferably undercut, approximately 0.005 inch, for a purpose that will presently appear.

I have found that by relating the parts in this manner, and journalling the auxiliary spindle in a combined radial and thrust bearing in the auxiliary housing, the removable shaft may be removed from the housing and rigidly secured to the drill press spindle and thereafter the housing may be installed upwardly over the shaft and the end of the quill, insuring proper installation of the attachment and that by so designing and proportioning the parts as to locate the lower end of the shaft out of endwise thrust-transmitting relationship with any of the other parts of the structure, a slow speed attachment is provided which precludes the transmission of drilling thrusts to the drill press spindle, thereby avoiding wear of the bearings in which it is journalled and possible damage to the drill press.

Referring now more particularly to Figure 3, journalled in ball bearings 31 and 32 in the lower end of quill 17 is a drill press spindle 33, having a tapered inner surface 34, such as a Morse taper, and a transverse slot 35. Input shaft 28 is tapered to snugly fit bore 34 of the spindle and carries a tang 36 cooperating with the walls of bore 35 to positively key the input shaft to the spindle. A drift may be inserted in slot 35 to release shaft 28 in well known manner.

The upper end of casing section 25 is provided with a cylindrical recess 37 which fits over the lower end of quill 17, and a shoulder 38 which abuts the end of the quill and accurately locates the casing thereon. Casing section 25 is also provided with split portions 39 which are adapted to be pulled together by a nut and bolt assembly 41, to rigidly lock the attachment in place on the quill in the position shown in Figure 3.

Mounted in a counter bore 43 in casing section 26, and having its outer race tightly locked in place by a nut 44, is a double row ball bearing 45 which is preferably of the "preloaded" type, so as to eliminate all end-play, and also have appreciable axial as well as radial load carrying capacity. A lubricant seal 46 carried in a counter bore in nut 44, and a lubricant seal 47 installed in a counter bore 48 of the casing, preclude escape of lubricant from the bearing and also exclude certain metal particles and other extraneous material. Lubricant may be introduced into the bearing in any well known manner.

Rigidly mounted in the inner race of bearing 45, and having a tapered inner bore 51 and a transverse slot 52, is an auxiliary spindle 53. The dimensions of bore 51 and slot 52 of the spindle in any one attachment preferably correspond exactly to those of drill press spindle 33, so that any tool or attachment T, which will fit into the main drill press spindle will also fit into the auxiliary spindle, thereby eliminating the need for adapters and simplifying the use of the device.

Mounted on a reduced portion of spindle 53, and pulled tightly against the inner race of bearing 45 by a nut 54 threaded on the spindle, is a gear 55, the latter being secured against rotation with respect to the spindle by a key 56. As seen in Figure 3, the threaded end of spindle 53 terminates substantially flush with nut 54, spaced a material distance below the end of shaft 28, so as to avoid the transmission of end thrust. The lower end of input shaft 28 is provided with a cylindrical pocket 58 into which the reduced piloting portion 59 of spindle 53 projects, in spaced relationship to the bottom of the pocket. A needle bearing assembly made up of an outer race 61 and a plurality of needle bearings 62 journals the neighboring shaft ends upon each other. The parts are preferably so dimensioned that outer race 61 may be pressed into opening 58 and be frictionally retained therein, it being observed that the race is provided with inturned ends 63, which retain the needle bearings in operative assembled positions. Shaft 28 may accordingly be freely removed from spindle portion 59, carrying the assembled needle bearing unit with it. A bore 64 in the lower end of shaft 28 provides for introduction of lubricant into the needle bearing assembly by splash from the interior of the housing. The needle bearing assembly preferably has a comparatively large degree of radial clearance with pilot portion 59, for instance of from 0.002 to 0.005 inch, to permit operation without binding, even when there is an appreciable amount of "run out" of the lower end of spindle 33.

The speed reduction between the input and output shafts is preferably effected by a countershaft gear assembly carried by a shaft 66 snugly mounted in aligned bores in the casing sections and locked against rotation by a set screw 67 threaded into section 25. The lower end of the bore in casing section 26 is closed by a plug 68 to prevent the escape of lubricant from the housing.

Freely journalled on needle bearing assemblies 69 and 71 on shaft 66 is a gear 72 having a hub 73. Tightly fitted on hub 73, and locked against rotation by means of a key 74, is a gear 75, which meshes with drive gear 29, and the teeth are preferably undercut 0.005 inch, so as to operate properly even when there is run out of spindle 33. Endwise displacement of the countershaft gear assembly is restrained by engagement with a spot face 76 provided in section 26, and by the upper wall 77 of casing section 25.

From the foregoing it is apparent that rotation of gear 29 will drive gear 75 and rotate the countershaft assembly at a reduced speed, and that rotation of the latter, through meshing of gears 72 and 55, will rotate spindle 53 at a further reduced rate of speed, in the same direction as main spindle 33.

Rotation of the slow speed attachment bodily about the axis of the quill is restrained by a stop rod 79 secured in a lug 81 on casing section 25 by means of a nut 82. The stop rod in the present instance is the standard drill press stop rod and has been removed from the collar (not shown) with which the drill press is equipped. It is provided with flat sides 83 which slidably coact with a pair of stop lugs 84 formed on head structure 12. The stop rod accordingly restrains bodily rocking movement of the quill and the attachment about the quill axis in response to the torque reaction developing during operation. A pair of stop nuts 85 on the rod cooperate with the lugs to limit downward movement of the quill and attachment.

In Figure 4 I have shown a member 87, preferably of wood or any other suitable material, having a central bore 88, which is adapted to fit into recess 37 of casing section 25 and to frictionally retain shaft 28 therein during shipping or storage, in the manner indicated by phantom lines in Figure 4. By tightening the nut and bolt assembly 41, member 87 may be clamped in place in the housing with shaft 28 frictionally fitted into opening 88, member 87 maintains shaft 28 out of contact with the other parts of the device and the assembly forms an effective dust closure, to prevent the entrance of dirt or extraneous material into the housing during handling.

The novel attachment of the invention is applied to the drill press as follows. The spindle 33 of the drill press is first checked to determine the degree of run out. If it has been abused so that it runs out in excess of 0.006 inch, it should be corrected before the unit is applied. After the spindle has been found true or has been brought to within 0.005 inch of run out, the quill is lowered about three inches and locked in place by bolt 18. The stop rod collar is removed from the quill and the stop rod installed in lug 81 of the attachment. Shaft 28 is then removed from wood plug 87 and securely inserted in spindle 33. The attachment housing is now applied upwardly over the end of shaft 28, it being only necessary to grasp spindle 53 and rock it back and forth slightly to mesh gears 29 and 75, the needle bearing assembly freely slipping over the upper end of pilot portion 59. When shoulder 38 strikes the end of the quill the housing is clamped in place by tightening bolt assembly 41. Installation of the attachment is now complete and the quill is now freed by loosening clamp bolt 18 and the quill raised and lowered a few times to make sure stop rod 79 is properly aligned with lugs 84 and is not rubbing or binding. Nut 82 is then tightened to lock the stop rod in place. The quill return spring contained in closure 23 is now adjusted to increase the counterbalancing action and to at least partially compensate for the increased load on the quill.

The device is now ready for operation and by installing the proper tools in spindle 53 any desired "slow speed" operation, within the capacity of the machine, may be carried out, as for example countersinking, counterboring, wood drilling and the like, it being understood that the ratio of the gearing is so chosen as to give the desired speed. I have found that a speed ratio of approximately four-to-one gives very satisfactory results when applied to the drill press illustrated. It is to be understood that a "Jacobs" chuck or any other suitable tool holding device may be secured to spindle 53, depending upon the service desired.

From the foregoing detailed disclosure it is apparent that I have provided a novel slow speed attachment which (1) may be readily applied to and removed from existing drill presses; (2) embodies an auxiliary spindle journalled in a bearing capable of taking all thrust loads set up during drilling; (3) embodies an insertable and removable shaft unit which may be securely applied to the drill press spindle and then have its housing applied to the drill press quill in such manner as to avoid transmitting thrust from said unit to the shaft and drill press spindle; (4) embodies a novel pilot bearing gear assembly so associated with the quill and drill press spindle that successful utilization of the attachment may be achieved even when there is substantial "run" out of the spindle; (5) includes novel means for holding the insertable shaft and excluding dust when the attachment is not in use; (6) includes a novel stop rod assembly which absorbs torque reaction; and (7) is of simple, low cost, rugged construction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a speed changing apparatus for use with a drill press having a conventional spindle, a housing adapted to be secured to the drill press quill, said housing having an open upper end; an output shaft journalled in the lower portion of said housing and terminating therebelow in means for securing a cutting tool thereto, the upper end of said output shaft terminating in a cylindrical pilot portion; a shaft rigidly secured to said spindle and freely insertable through the open upper end of said housing and having a cylindrical pilot portion at its lower end; an anti-friction bearing assembly carried by said last mentioned cylindrical pilot portion for journalling the pilot portions of said shafts for relative rotation and slidingly receiving said first mentioned cylindrical pilot portion; and gear means in said housing for transmitting power from said shaft to said output shaft.

2. In a drill press having a quill mounted for reciprocation in a head structure, and a spindle journalled in the quill, a shaft adapted to be rigidly secured to the spindle and carrying a drive gear at its lower end; a housing adapted to be slipped upwardly over said shaft and gear and having means for securing it rigidly to said quill, an output spindle journalled in a bearing in the lower portion of said housing in axial alignment with said shaft and terminating at its lower end in means for holding a cutting tool, the upper end of said output spindle and the lower end of said shaft being journalled for relative rotation upon each other by bearing means which is capable of sustaining radial loads only, said output spindle and shaft having neighboring axially spaced surfaces; and means on the upper end of said housing operable to stop upward movement of said housing, to establish a predetermined clearance between said axially spaced surfaces, thereby avoiding transmitting end thrust from said output spindle to said shaft.

3. In a drill press, a head structure; a quill mounted for guided reciprocation on said head structure and terminating at one end in a cylindrical portion; a drill spindle mounted for rotation in said quill and projecting out of said one end thereof; an auxiliary housing secured to the cylindrical portion of said quill and enclosing the projecting portion of said spindle; a shaft rigidly secured to the projecting portion of said spindle and carrying a drive gear at its free end; an output spindle mounted for rotation in a combined radial and thrust bearing in said housing with its axis in alignment with the axis of said shaft and carrying a driven gear disposed adjacent to but spaced from said drive gear and projecting outside said auxiliary housing and terminating in a drill holding device, said bearing being operable to transmit the entire drilling thrust to said auxiliary housing; a countershaft journalled in said housing and carrying gears meshing with said drive and driven gears; bearing means journalling the inner end of said shaft on the inner end of said output spindle and being incapable of transmitting axial thrust therebetween; a rod rigidly secured to said housing and disposed parallel to said quill; and abutment means on said head structure cooperating with said rod to preclude rotation of said housing and said quill about the axis of the latter in response to reactive torquing forces set up during drilling, the teeth of said drive gear and the gear on said countershaft with which it is meshed being undercut, and there being sufficient radial play in said means juornalling said shaft on said output spindle to permit substantial run out of said shaft without causing binding of said teeth.

4. A gear reducing mechanism for use with a drill press having a quill mounted for reciprocation in a head structure and a spindle journalled in said quill; an input shaft adapted for telescopic insertion into a hollow housing and for sliding engagement with an output shaft and having means for rigidly securing it to said spindle and a gear at its lower end for slidingly engaging a countershaft gear journalled in said housing; a hollow housing freely applicable to said quill upwardly over the end of said shaft and having means for limiting upward movement thereof with respect to said quill, means for securing said housing to said quill; an output spindle journalled in said housing and projecting therebelow; a driven gear on said output spindle; a countershaft in said housing; a gear on said countershaft meshing with said driven gear; a second gear on said countershaft meshable with said drive gear on said shaft when said housing is applied to said quill; and means for precluding rotation of said housing and said quill about the axis of the latter in response to forces set up during operation.

5. The apparatus defined in claim 4, wherein said output spindle is journalled in bearing means in said housing which is operable to transmit all end thrusts developing in said output spindle during operation directly to said housing, thereby relieving said shaft and spindle of all end thrust and a radial piloting bearing carried by said input shaft.

6. A reduction gear mechanism for a machine tool having a drive spindle journalled in a non-rotatable quill comprising an input shaft adapted to be independently secured to said drive spindle and having a hollow toothed end forming an input gear; a gear housing carried by said quill; an output spindle carried by said housing and having a piloting projection extending into said hollow toothed end of said input shaft; a combined radial and thrust bearing supporting said output spindle in said housing and adapted to transmit the axial thrust of said output spindle to said housing; a radial support bearing carried by said hollow end of said input shaft and adapted to slidingly receive said piloting projection whereby the adjacent ends of said input shaft and output spindle are journalled in non-thrust transmitting relationship; an output gear non-rotatably associated with said output shaft; and reduction gears rotatably journalled in said housing connecting said input and output gears.

7. The combination defined in claim 6, wherein said housing is apertured for telescopic assembly over said input gear.

JAMES TATE.

REFERENCES CITED

The following references are of record in the file of this patent:

UNITED STATES PATENTS

| Number | Name | Date |
|---|---|---|
| 1,326,398 | Fortin | Dec. 30, 1919 |
| 1,444,343 | Goodwin | Feb. 6, 1923 |
| 1,496,867 | Bee | June 10, 1924 |
| 1,718,721 | Weeks | June 25, 1929 |
| 1,110,455 | Nelson | Sept. 15, 1914 |
| 1,735,398 | Hoagland | Nov. 12, 1929 |
| 968,718 | Wahlstrom | Aug. 30, 1910 |